United States Patent
Kanno

(10) Patent No.: US 10,643,083 B2
(45) Date of Patent: May 5, 2020

(54) VEHICLE EXTERIOR ENVIRONMENT RECOGNITION APPARATUS

(71) Applicant: SUBARU CORPORATION, Tokyo (JP)

(72) Inventor: Aito Kanno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 221 days.

(21) Appl. No.: 15/961,772

(22) Filed: Apr. 24, 2018

(65) Prior Publication Data
US 2018/0336422 A1 Nov. 22, 2018

(30) Foreign Application Priority Data
May 17, 2017 (JP) .................. 2017-097773

(51) Int. Cl.
*G06K 9/00* (2006.01)
*G06T 7/62* (2017.01)
*G06T 7/11* (2017.01)

(52) U.S. Cl.
CPC ..... *G06K 9/00791* (2013.01); *G06K 9/00805* (2013.01); *G06T 7/11* (2017.01); *G06T 7/62* (2017.01); *B60W 2550/308* (2013.01); *G06T 2207/20061* (2013.01)

(58) Field of Classification Search
CPC ........... G06K 9/00791; G06K 9/00805; G06K 9/4633; G06K 9/4642; G06T 7/11; G06T 7/50; G06T 7/62; G06T 2207/20061; G06T 2207/30252; G06T 2207/30261
See application file for complete search history.

(56) References Cited

U.S. PATENT DOCUMENTS

| | | | |
|---|---|---|---|
| 2014/0270495 A1* | 9/2014 | Tu et al. | G06K 9/6259 382/160 |
| 2017/0076161 A1* | 3/2017 | Nomura | G06K 9/00805 |
| 2018/0253610 A1* | 9/2018 | Hall | G06K 9/00369 |
| 2019/0019045 A1* | 1/2019 | Ogura | G06K 9/4604 |

FOREIGN PATENT DOCUMENTS

| | | |
|---|---|---|
| JP | 3349060 B2 | 11/2002 |
| JP | 2008-134877 A | 6/2008 |

* cited by examiner

*Primary Examiner* — Andrew W Johns
(74) *Attorney, Agent, or Firm* — McDermott Will & Emery LLP

(57) ABSTRACT

A vehicle exterior environment recognition apparatus includes a three-dimensional object region identifier, a wheel region identifier, and a wheel determiner. The three-dimensional object region identifier is configured to identify a three-dimensional object region out of a screen. The three-dimensional object region includes a three-dimensional object. The wheel region identifier is configured to identify a wheel region out of the three-dimensional object region. The wheel region includes a presumed wheel that seems to correspond to a wheel of a bicycle. The wheel determiner is configured to determine whether or not an area ratio is smaller than a predetermined value. The area ratio is a ratio of area of a segment of the wheel region to area of the wheel region, with a relative distance from the segment to an own vehicle falling within a predetermined range.

5 Claims, 6 Drawing Sheets

VEHICLE EXTERIOR ENVIRONMENT RECOGNITION APPARATUS

CROSS-REFERENCE TO RELATED APPLICATIONS

The present application claims priority from Japanese Patent Application No. 2017-097773 filed on May 17, 2017, the entire contents of which are hereby incorporated by reference.

BACKGROUND

The technology relates to a vehicle exterior environment recognition apparatus that identifies a specific object present in a traveling direction of an own vehicle.

A technique has been known that includes detecting a three-dimensional object, such as a vehicle located ahead of an own vehicle, and performing a control to avoid collision with a preceding vehicle (i.e., a collision avoidance control) or performing a control to keep a safe inter-vehicular distance from the preceding vehicle (i.e., a cruise control). For example, reference is made to Japanese Patent No. 3349060.

As a technique to detect the three-dimensional object, Japanese Unexamined Patent Application Publication (JP-A) No. 2008-134877 discloses a technique that includes detecting a parallel-traveling vehicle that travels parallel with the own vehicle, with reference to an image pattern photographed sideward of the own vehicle, on the basis of symmetry of an edge of the own vehicle in a front-rear direction of the own vehicle.

SUMMARY

An aspect of the technology provides a vehicle exterior environment recognition apparatus that includes a three-dimensional object region identifier, a wheel region identifier, and a wheel determiner. The three-dimensional object region identifier is configured to identify a three-dimensional object region out of a screen. The three-dimensional object region includes a three-dimensional object. The wheel region identifier is configured to identify a wheel region out of the three-dimensional object region. The wheel region includes a presumed wheel that seems to correspond to a wheel of a bicycle. The wheel determiner is configured to determine whether or not an area ratio is smaller than a predetermined value. The area ratio is a ratio of area of a segment of the wheel region to area of the wheel region, with a relative distance from the segment to an own vehicle falling within a predetermined range.

An aspect of the technology provides a vehicle exterior environment recognition apparatus that includes circuitry. The circuitry is configured to identify a three-dimensional object region out of a screen. The three-dimensional object region includes a three-dimensional object. The circuitry is configured to identify a wheel region out of the three-dimensional object region. The wheel region includes a presumed wheel that seems to correspond to a wheel of a bicycle. The circuitry is configured to determine whether or not an area ratio is smaller than a predetermined value. The area ratio is a ratio of area of a segment of the wheel region to area of the wheel region, with a relative distance from the segment to an own vehicle falling within a predetermined range.

DETAILED DESCRIPTION

Figure 1:
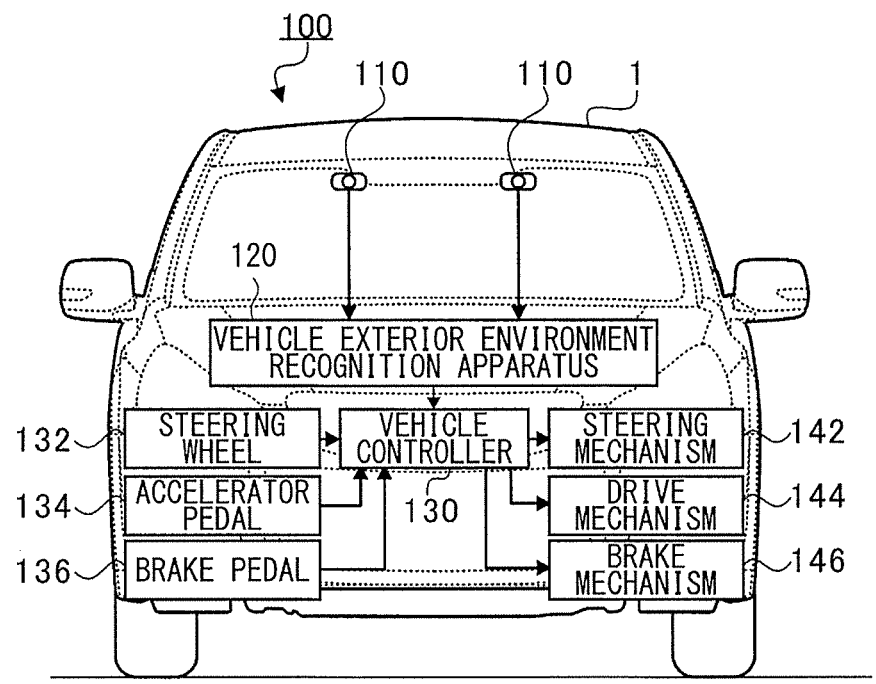
FIG. 1 is a block diagram illustrating a relation of connection in a vehicle exterior environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Non-limiting examples of a specific object present in a traveling direction of an own vehicle may include a preceding vehicle that travels in a same direction, and objects such as a pedestrian and a bicycle that cross a traveling path in a lateral direction of the own vehicle. Regarding the objects such as the pedestrian and the bicycle that cross the traveling path, it is desirable to determine their pedestrian-likeliness or bicycle-likeliness, on the basis of their outlines. The bicycle, however, generally crosses faster than the pedestrian does. If a collision avoidance control is postponed until confirmation of the entire outline of the bicycle, a distance from the own vehicle to the bicycle may become short during the postponement. This may necessitate an abrupt action as the collision avoidance control. What is desired is, therefore, to identify a wheel or a circular shape as a part of the bicycle by, for example, Hough transform, leading to even earlier identification of the bicycle itself.

However, there are various three-dimensional objects in the traveling direction of the own vehicle. Some three-dimensional objects may have shapes and surface coloring similar to a circle, i.e., a wheel. This may result in erroneous detection of a three-dimensional object that is not actually a bicycle, as a wheel of a bicycle.

It is desirable to provide a vehicle exterior environment recognition apparatus that makes it possible to detect a specific object such as a bicycle with high accuracy.

[Vehicle Exterior Environment Recognition System 100]

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller (e.g., an engine control unit (ECU)) 130. The implementation may include two image-capturing units 110 without limitation.

The two image-capturing units 110 may each include an imaging device such as, but not limited to, a charge-coupled device (CCD) and a complementary metal-oxide semiconductor (CMOS). The image-capturing units 110 may each be able to capture an image of vehicle exterior environment ahead of the own vehicle 1, and to generate a luminance image that includes at least information on luminance. The luminance image may be a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may be an image that captures a three-dimensional object present in a detected region ahead of the own vehicle 1. Non-limiting examples of the three-dimensional objects to be recognized by the image-capturing units 110 may include a three-dimensional object that is present independently, and an object as a part of the independently-present object. Non-limiting examples of the independently-present object may include a bicycle, a pedestrian, a vehicle, a traffic light, a road (or a traveling path), a road sign, a guardrail, and a building. Non-limiting examples of the object as a part of the independently-present object may include a wheel of a bicycle.

The vehicle exterior environment recognition apparatus 120 may obtain the luminance images from the respective image-capturing units 110, and derive parallax information with use of so-called pattern matching. The pattern matching may involve extracting any block (e.g., an array of 4 pixels horizontally by 4 pixels vertically) from one of the luminance images, and searching for a corresponding block in another of the luminance images. The parallax information may include a parallax, and an on-screen position of any block. The on-screen position indicates a position of any block on a screen. In this implementation, the term "horizontally" refers to an on-screen lateral direction of the captured image, while the term "vertically" refers to an on-screen vertical direction of the captured image. A possible example of the pattern matching may be to compare a pair of images in terms of luminance (Y) block by block. Non-limiting examples may include techniques such as SAD (Sum of Absolute Difference), SSD (Sum of Squared intensity Difference), and ZNCC (Zero-mean Normalized Cross Correlation). The SAD includes obtaining differences in the luminance. The SSD includes using the differences squared. The ZNCC includes obtaining similarity of variance values obtained by subtracting an average value from luminance values of pixels. The vehicle exterior environment recognition apparatus 120 may perform such a block-by-block parallax derivation process, for all blocks displayed in the detected region of, for example, 600 pixels by 200 pixels. In this implementation, one block is assumed to be the array of 4 pixels by 4 pixels, but the number of the pixels inside one block may be set at any value.

It is to be noted that the vehicle exterior environment recognition apparatus 120 is able to derive the parallax for each of the blocks, but the vehicle exterior environment recognition apparatus 120 is not able to recognize what kind of object each of the blocks belongs to. The block serves as a unit of detection resolution. It follows, therefore, that the parallax information is derived not by the object but independently by the detection resolution in the detected region, e.g., by the block. In this implementation, an image with which the parallax information thus derived is correlated is referred to as a distance image, in distinction from the luminance image as mentioned above.

Figure 2A:
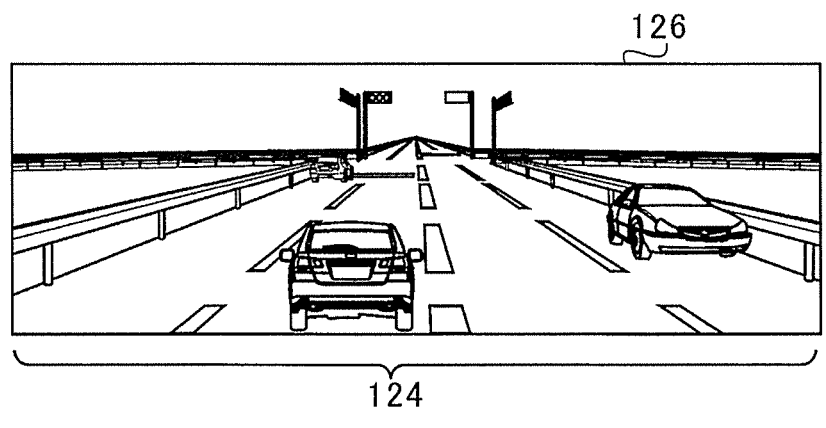
FIGS. 2A and 2B respectively describe a luminance image and a distance image.
Figure 2B:
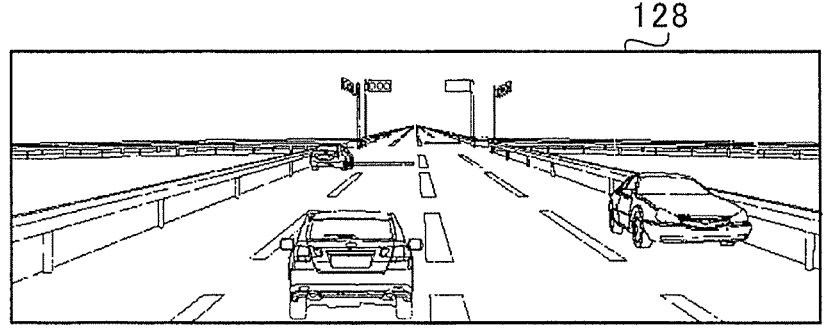

FIGS. 2A and 2B respectively describe the luminance image 126 and the distance image 128. FIG. 2A describes a non-limiting example in which the luminance image 126 as illustrated in FIG. 2A is generated for the detected region 124 by means of the two image-capturing units 110. Note that FIG. 2A schematically illustrates only one of the two luminance images 126 generated by the respective image-capturing units 110 for easier understanding. The vehicle exterior environment recognition apparatus 120 may obtain the parallax for each of the blocks from the luminance images 126 to form the distance image 128 as illustrated in FIG. 2B. Each of the blocks in the distance image 128 may be associated with the parallax of the relevant block. For description purpose, each of the blocks for which the parallax is derived is denoted by a black dot.

Moreover, the vehicle exterior environment recognition apparatus 120 may perform grouping of blocks, as an object. The grouping may be made with the use of luminance values, i.e., color values, based on the luminance image 126, and with the use of three-dimensional positional information in real space. The three-dimensional positional information may be calculated on the basis of the distance image 128, and include a relative distance to the own vehicle 1. The blocks to be grouped may be of equal color values, and of close relative distances included in the three-dimensional positional information. The vehicle exterior environment recognition apparatus 120 may identify which specific object the object in the detected region ahead of the own vehicle 1 corresponds to. Non-limiting example of the specific object may include a preceding vehicle and a bicycle. Moreover, upon identifying the three-dimensional object in this way, the vehicle exterior environment recognition apparatus 120 may further control the own vehicle 1, to avoid collision with the three-dimensional object (i.e., a collision avoidance control) or to keep a safe inter-vehicular distance from the preceding vehicle (i.e., a cruise control). Note that the relative distance as mentioned above may be obtained by converting the parallax information for each of the blocks in the distance image 128 to the three-dimensional positional information with the use of a so-called stereo method. In this implementation, the stereo method refers to a method of deriving, from the parallax of the object, the relative distance of the relevant object with respect to the image-capturing units 110, with the use of triangulation.

The vehicle controller 130 may control the own vehicle 1 by accepting an operation input of the driver through a steering wheel 132, an accelerator pedal 134, and a brake pedal 136 and transmitting the operation input to a steering mechanism 142, a drive mechanism 144, and a brake mechanism 146. The vehicle controller 130 may control the steering mechanism 142, the drive mechanism 144, and the brake mechanism 146, in accordance with instructions from the vehicle exterior environment recognition apparatus 120.

As described, the vehicle exterior environment recognition system 100 may identify the objects such as the pedestrian and the bicycle that cross the traveling path in the lateral direction of the own vehicle. Regarding the objects such as the pedestrian and the bicycle that cross the traveling path, it is desirable to determine their pedestrian-likeliness or bicycle-likeliness, on the basis of their outlines. The bicycle, however, crosses faster than the pedestrian does. If the collision avoidance control is postponed until the confirmation of the entire outline of the bicycle, the distance from the own vehicle 1 to the bicycle may become short during the postponement. This may necessitate the abrupt action as the collision avoidance control.

Accordingly, when a bicycle comes into the luminance image from outside the luminance image, it is desirable to promptly recognize possibility that what is coming is a bicycle, upon grasping a part of the bicycle, leading to enhanced responsiveness. In the implementation, therefore, when a wheel (i.e., a front wheel) as a part of the bicycle appears on the screen, it is desirable to appropriately determine its wheel-likeliness on the basis of its shape, i.e., a circular shape, to promptly detect the bicycle, and to perform the collision avoidance control with stability. However, there are various three-dimensional objects in the traveling direction of the own vehicle 1. Some three-dimensional objects may have the shapes and the surface coloring similar to a circle, i.e., a wheel. This may result in the erroneous detection of the three-dimensional object that is not actually a bicycle, as a wheel of a bicycle. Thus, in this implementation, it is desirable to detect the specific object such as the bicycle with high accuracy, with the use of distance information. As used herein, the distance information refers to information regarding the relative distance as mentioned above.

In the following, described in detail is a configuration of the vehicle exterior environment recognition apparatus 120. A description is given here in detail of an identification process of the three-dimensional object (e.g., a wheel of a bicycle) in the detected region ahead of the own vehicle 1. Note that a configuration less related to features of the implementation will not be described in detail.

[Vehicle Exterior Environment Recognition Apparatus 120]

Figure 3:
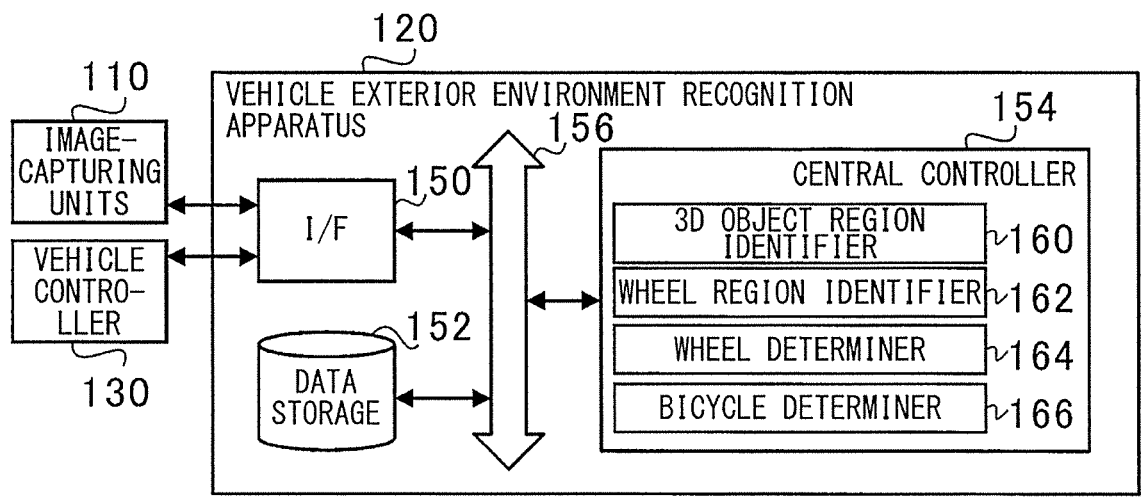
FIG. 3 is a functional block diagram illustrating schematic functions of a vehicle exterior environment recognition apparatus.

FIG. 3 is a functional block diagram illustrating schematic functions of the vehicle exterior environment recognition apparatus 120. Referring to FIG. 3, the vehicle exterior environment recognition apparatus 120 may include an interface (I/F) 150, a data storage 152, and a central controller 154.

The interface 150 may be an interface that exchanges information bi-directionally between devices including, without limitation, the image-capturing units 110 and the vehicle controller 130. The data storage 152 may include a random access memory (RAM), a flash memory, a hard disk drive (HDD), or any other suitable storage device. The data storage 152 may store various pieces of information necessary for processes to be carried out by the functional blocks to be described hereinafter.

The central controller 154 may include a semiconductor integrated circuit, and control devices including, without limitation, the interface 150 and the data storage 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may function as a three-dimensional object region identifier 160, a wheel region identifier 162, a wheel determiner 164, and a bicycle determiner 166. In the following, a detailed description is given, on the basis of operation of each functional block of the central controller 154 as well, of a vehicle exterior environment recognition process that involves, as a feature of the implementation, recognizing a bicycle.

[Vehicle Exterior Environment Recognition Process]

Figure 4:
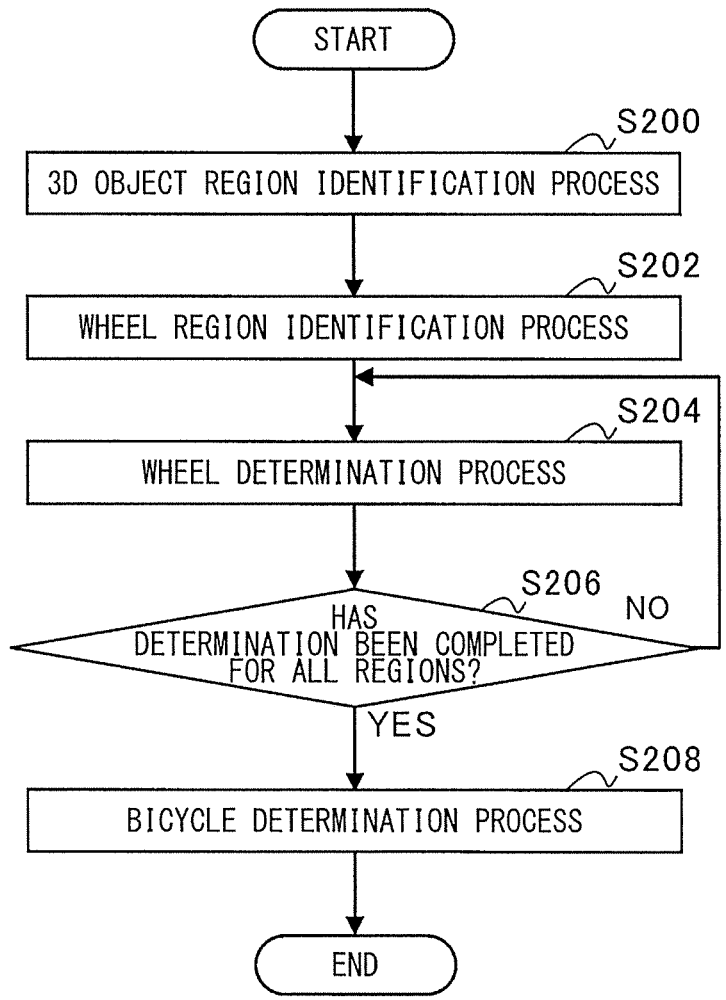
FIG. 4 is a flowchart illustrating an example of a flow of a vehicle exterior environment recognition process.

FIG. 4 is a flowchart illustrating an example of a flow of the vehicle exterior environment recognition process. The vehicle exterior environment recognition process may involve execution of the following processes: a three-dimensional object region identification process (S200); a wheel region identification process (S202); a wheel determination process (S204); a completion confirmation process (S206); and a bicycle determination process (S208). In the three-dimensional object region identification process (S200), the three-dimensional object region identifier 160 identifies a three-dimensional object region out of the screen. The three-dimensional object region includes the three-dimensional object. In the wheel region identification process (S202), the wheel region identifier 162 identifies a wheel region out of the three-dimensional object region. The wheel region includes a presumed wheel that seems to correspond to a wheel of a bicycle. In the wheel determination process (S204), the wheel determiner 164 determines whether or not an area ratio is smaller than a predetermined value. The determination may be made for each wheel region identified, on the basis of the distance information. The area ratio is a ratio of area of a segment of the wheel region to area of the wheel region, with the relative distance from the segment to the own vehicle 1 falling within a predetermined range. The completion confirmation process (S206) may involve confirming whether determination as to the wheel-likeliness has been completed for all of a plurality of the wheel regions. Lastly, in the bicycle determination process (S208), the bicycle determiner 166 may determine whether or not the three-dimensional object is a bicycle, on the basis of a result of the wheel determination process.

[Three-Dimensional Object Region Identification Process S200]

Figure 5:
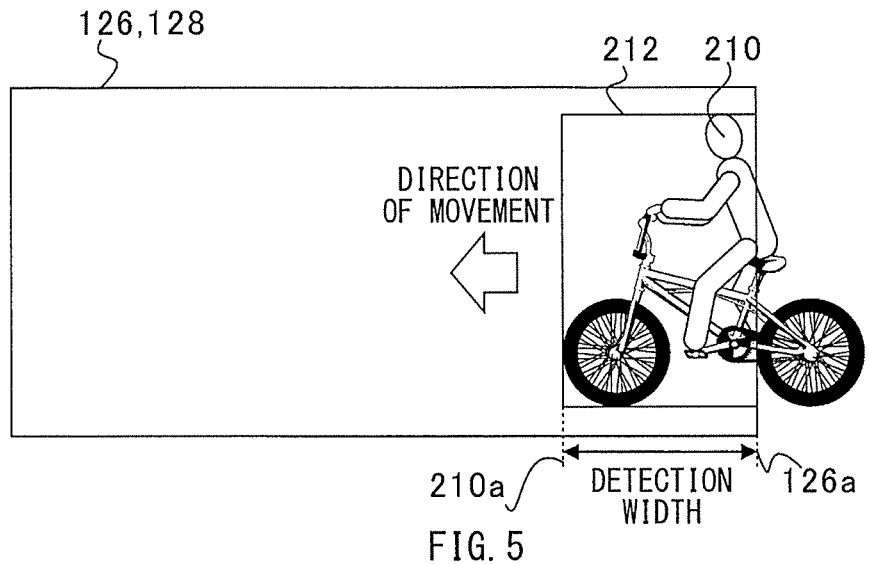
FIG. 5 describes an example of a three-dimensional object region identification process.

FIG. 5 describes an example of the three-dimensional object region identification process S200. The three-dimensional object region identifier 160 may refer to a plurality of continuous (time-divided) luminance images 126 generated by the image-capturing units 110, and detect the three-dimensional object 210, on the basis of a difference between the luminance images 126 generated at different timing. The three-dimensional object 210 may be an object that comes into the luminance image 126 from outside the luminance image 126, and satisfies predetermined conditions. In this implementation, the predetermined conditions may be that the relative distance in the distance image 128 from the three-dimensional object 210 to the own vehicle 1 is equal to or smaller than a predetermined distance (e.g., 15 meters), and that a height of the three-dimensional object 210 from a ground level is equal to or smaller than a predetermined height (e.g., 2 meters).

As illustrated in FIG. 5, when a horizontal width of the three-dimensional object 210 becomes equal to a predetermined detection width, the three-dimensional object region identifier 160 may identify, as the three-dimensional object region 212, a predetermined range of the luminance image 126. The horizontal width of the three-dimensional object 210 may be a difference between a right end 126a of the luminance image 126 and a left end 210a of the three-dimensional object 210. In this implementation, the three-dimensional object region identifier 160 may identify, as the three-dimensional object region 212, a rectangular region that incorporates the three-dimensional object 210 in an image. Moreover, at this occasion, the three-dimensional object region identifier 160 may set, as a direction of movement of the three-dimensional object 210, a direction along a horizontal direction of the left end 210a of the three-dimensional object 210 with respect to the right end 126a of the luminance image 126. In one specific but non-limiting implementation, as illustrated in FIG. 5, when the three-dimensional object 210 is located on right side of the luminance image 126, the direction of movement may be leftward. When the three-dimensional object 210 is located on left side of the luminance image 126, the direction of movement may be rightward.

It is to be noted that the identification of the three-dimensional object region 212 may be postponed until the width of the three-dimensional object 210 becomes equal to the predetermined detection width, in order to allow the width of the three-dimensional object 210 to become large enough to recognize a wheel as intended in the implementation.

[Wheel Region Identification Process S202]

Figure 6A:
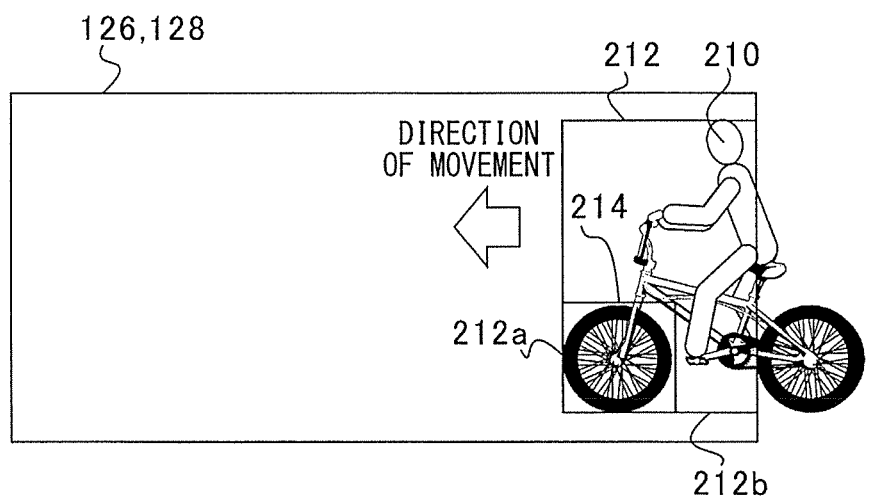
FIGS. 6A and 6B describe an example of a wheel region identification process.
Figure 6B:
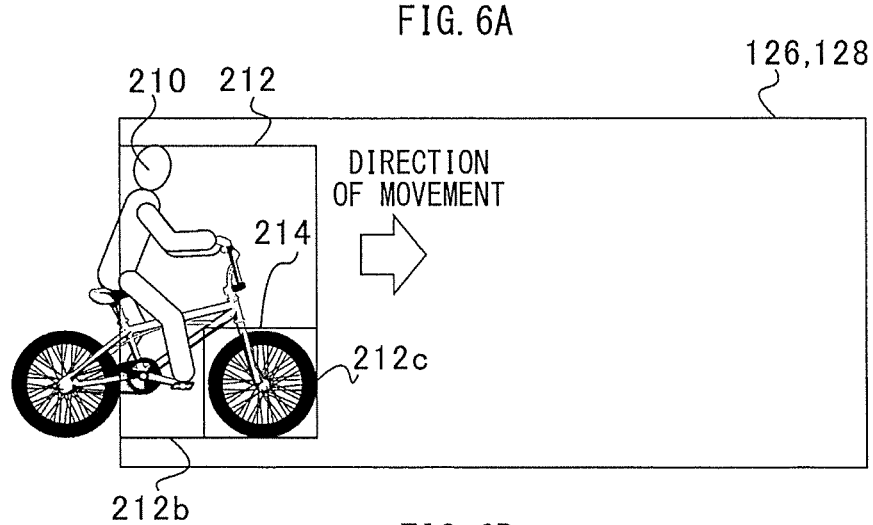

FIGS. 6A, 6B, 7, and 8 describe an example of the wheel region identification process S202. The wheel region identifier 162 identifies the wheel region 214 out of the three-dimensional object region 212 identified by the three-dimensional object region identifier 160. The identification may be made on the basis of the direction of the movement of the three-dimensional object 210. The wheel region 214 includes a presumed wheel that seems to correspond to a wheel of a bicycle. In one specific but non-limiting example, as illustrated in FIG. 6A, in a case where the direction of the movement of the three-dimensional object 210 is leftward, the wheel region identifier 162 may identify, as the wheel region 214, a square region with each side of a predetermined length, with reference to a left end 212a of the three-dimensional object region 212 and a lower end 212b of the three-dimensional object region 212. As illustrated in FIG. 6B, in a case where the direction of the movement of the three-dimensional object 210 is rightward, the wheel region identifier 162 may identify, as the wheel region 214, a square region with each side of a predetermined length, with reference to a right end 212c of the three-dimensional object region 212 and the lower end 212b of the three-dimensional object region 212. It is to be noted that the predetermined length may be a length obtained by adding a margin, e.g., 3 inches, to an assumed size of a wheel of a bicycle, e.g., 27 inches or about 69 centimeters. The margin may be set in consideration of a detection error. It is to be noted that an index that indicates the size in this specification, e.g., 27 inches, is replacement of, for example, the size on the screen, e.g., the number of pixels, with an actual size, on the basis of the relative distance.

Thereafter, the wheel region identifier 162 may identify, with the use of Hough transform, an outline of the presumed wheel included in the wheel region 214. The wheel region identifier 162 may re-identify the wheel region 214, to allow a width and a height of the wheel region 214 to be equal to a width and a height of the outline of the presumed wheel. Hough transform is a technique that includes carrying out a voting procedure on points that have possibility of presence of a center of an object, out of feature points including edges on the luminance image 126, and detecting an object that has received many votes, i.e., a predetermined number of votes or more. As described, in this implementation, the description is focused on Hough transform, but this implementation does not adhere to Hough transform. Various existing shape recognition techniques other than Hough transform such as template matching and a least square method may be used.

Described is a processing procedure of Hough transform. In this implementation, let us assume that as illustrated in part (a) of FIG. 7, three pixels 220c, 220d, and 220e are extracted from the luminance image 126. Each of the three pixels 220c, 220d, and 220e has an edge. Originally, the three pixels 220c, 220d, and 220e are each a part of a wheel of a circular shape, but finding the circular shape clearly, on the basis of the luminance image 126, is assumed to be normally difficult.

Hough transform is a technique of detecting a geometrical shape, e.g., a circle or a line, from a plurality of points. Hough transform is based on a theory that a center of a circle that passes through any pixel and has a radius n is present on a circumference of a circle that has a radius n with the relevant pixel serving as a center. For example, in the part (a) of FIG. 7, a circle 222 passes through the three pixels 220c, 220d, and 220e. A center of the circle 222 is present on circumferences of circles, with the three pixels 220c, 220d, and 220e serving as respective centers of the circles. It is, however, difficult to identify the radius n on the basis of information solely on the edges. Therefore, a plurality of radii n of different levels are prepared. The voting procedure is carried out on pixels on the circles of the radii n of the different levels, with the three pixels 220c, 220d, and 220e serving as the centers of the circles. If the number of votes of any one of the pixels becomes equal to or larger than a predetermined value, the radii n and the relevant pixel are respectively decided to be a radius and a center of a wheel.

Figure 7:
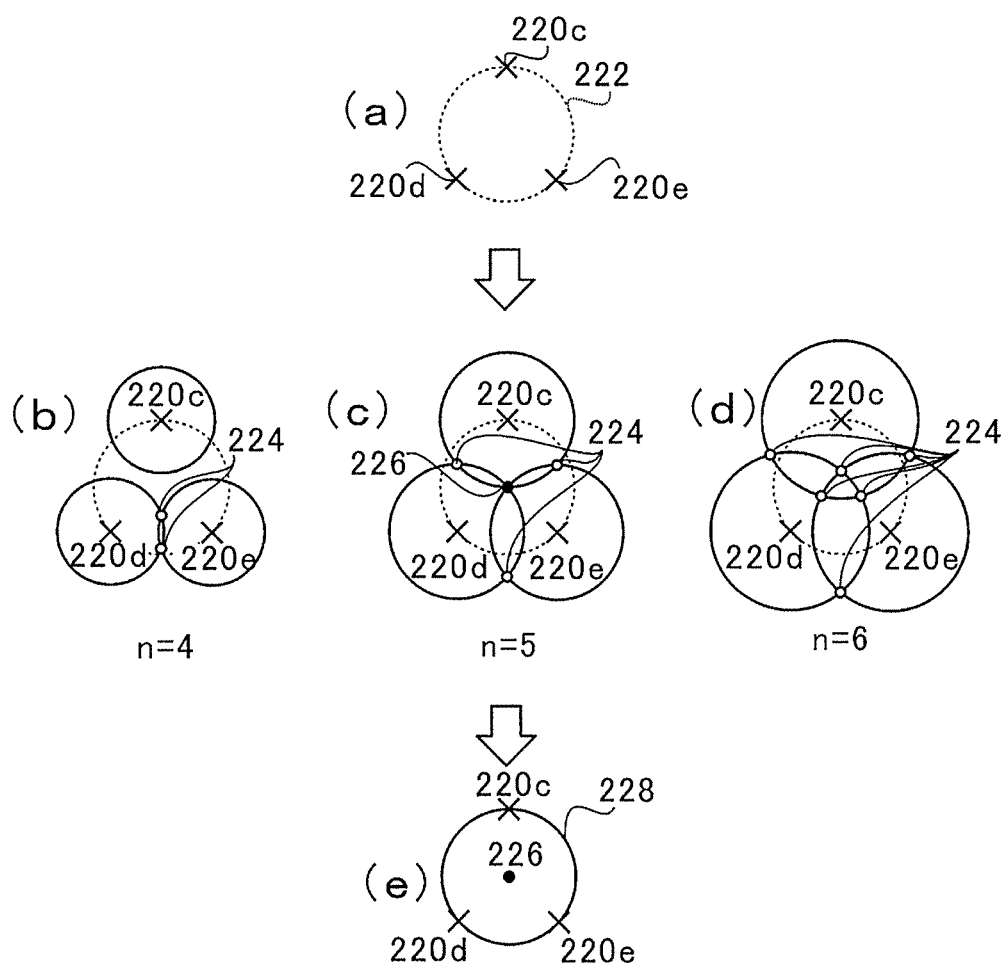
FIG. 7 describes an example of the wheel region identification process.

For example, as illustrated in parts (b), (c), and (d) of FIG. 7, the circles of the different radii n are formed, with the three pixels 220c, 220d, and 220e serving as the centers. In the part (b) of FIG. 7, circles of the radii n of 10 inches (n=10), i.e., of diameters of 20 inches, are formed. In the part (c) of FIG. 7, circles of the radii n of 12 inches (n=12), i.e., of diameters of 24 inches, are formed. In the part (d) of FIG. 7, circles of the radii n of 13.5 inches (n=13.5), i.e., of diameters of 27 inches, are formed. The voting procedure is carried out on pixels included in loci of the circles. In other words, unit indexes are correlated. In the part (b) of FIG. 7, the number of the votes is 2 at two pixels 224. That is, the two unit indexes are correlated. In the part (c) of FIG. 7, the number of the votes is 2 at three pixels 224, while the number of the votes is 3 at one pixel 226. Similarly, in the part (d) of FIG. 7, the number of the votes is 2 at six pixels 224.

At this occasion, the number of the votes is 3, i.e., the predetermined value, solely at the pixel 226. Thus, the pixel 226 is identified as the center of the circle that passes through the three pixels 220c, 220d, and 220e. The radius n of 12 inches (n=12) in deriving the pixel 226 is identified as the radius of the circle that passes through the three pixels 220c, 220d, and 220e. In this way, as illustrated in part (e) of FIG. 7, a circle 228 is identified that passes through the three pixels 220c, 220d, and 220e. In this implementation, the description is made by giving the three pixels 220c, 220d, and 220e as examples, for purposes of convenience of the description. However, there are cases where a pixel that is not included in the circle 228 serves as a feature point, and cases where a pixel that appears at a different position from its original position by pixelation, or discretization, serves as the feature point. In order to avoid influences of such a noise, the voting procedure is actually carried out on many points, to make a stable detection by the law of large numbers.

In this implementation, Hough transform is not performed randomly on the luminance image 126. Instead, the wheel region 214 is identified in the wheel region identification process S202 and the wheel determination process S204 as described above. Solely the wheel region 214 thus identified is subjected to Hough transform. Hence, it is possible to reduce the number of times Hough transform is performed, allowing for shorter processing time.

Figure 8:
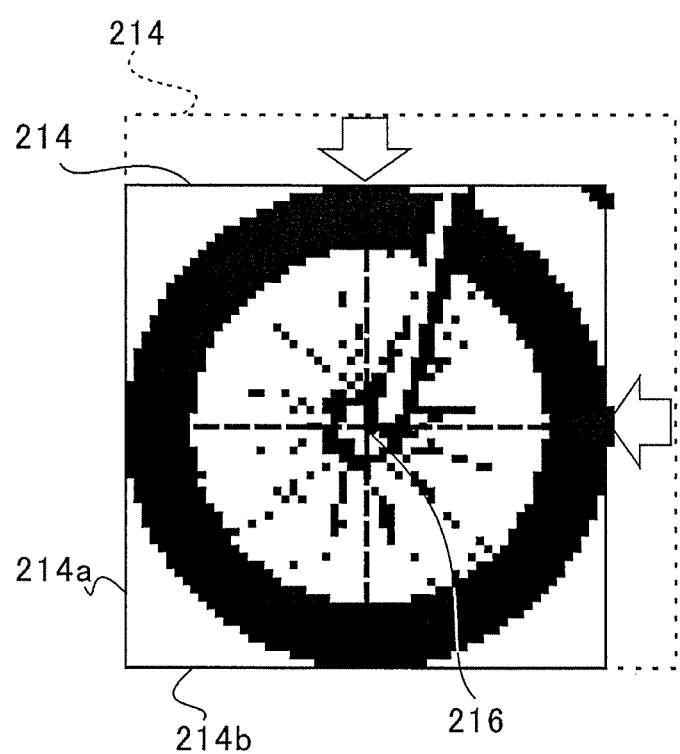
FIG. 8 describes an example of the wheel region identification process.

In the case where the direction of movement of the three-dimensional object 210 is leftward, as illustrated in FIG. 8, the wheel region identifier 162 may newly re-identify, as the wheel region 214, a square region with each side of twice the radius n identified (e.g., 24 inches), with reference to a left end 214a of the initially-identified wheel region 214 and a lower end 214b of the initially-identified wheel region 214. The wheel region identifier 162 may set a center of the re-identified wheel region 214 as a center 216 of the presumed wheel included in the wheel region 214. Thus, the width and the height of the wheel region 214 become equal to the width and the height of the outline of the presumed wheel.

[Wheel Determination Process S204]

Figure 9:
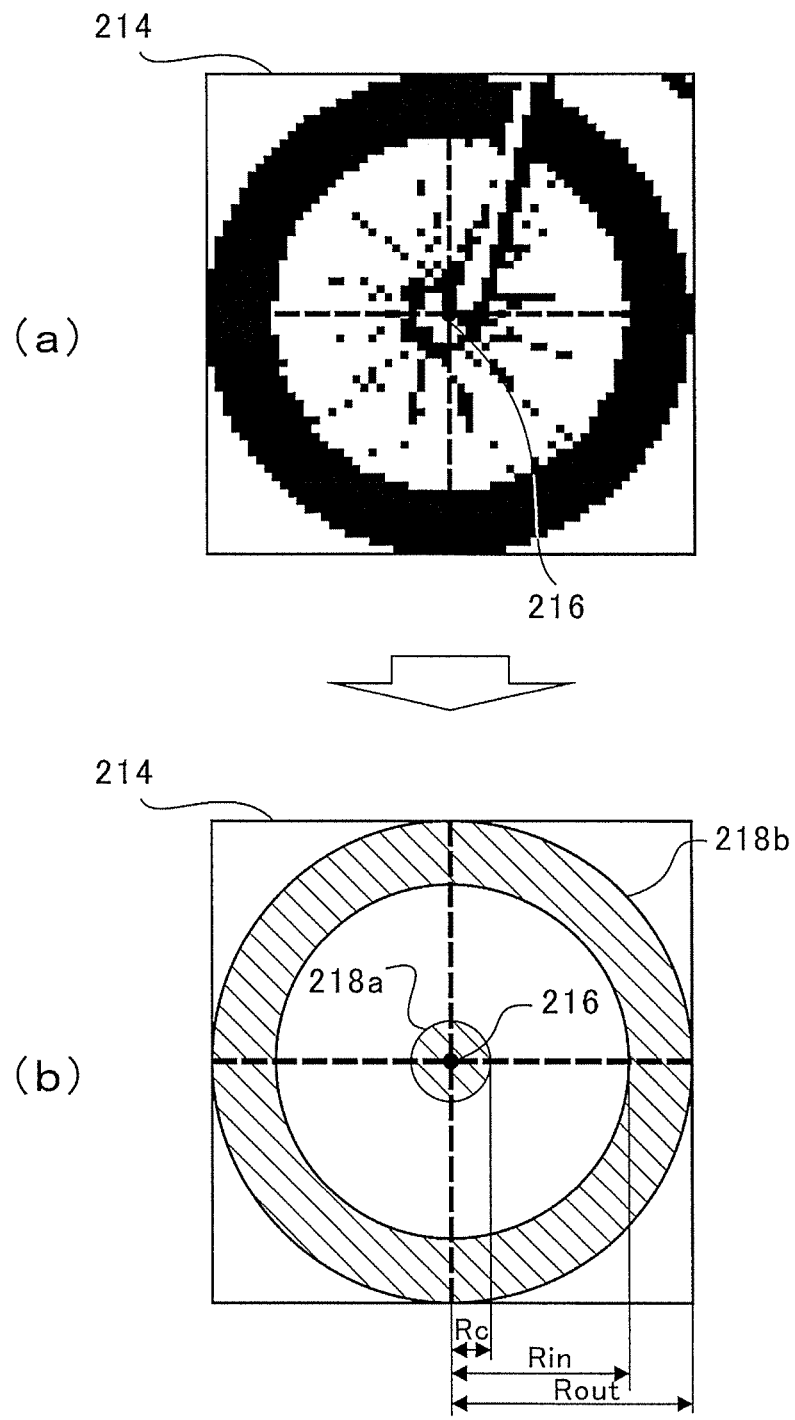
FIG. 9 describes an example of a wheel determination process.

FIG. 9 describes an example of the wheel determination process S204. The wheel determiner 164 may make a determination as to wheel-likeliness of the three-dimensional object included in the re-identified wheel region 214. In other words, the wheel determiner 164 may determine whether or not the three-dimensional object included in the re-identified wheel region 214 is a wheel. Description is now made of features of a wheel of a bicycle, and features of the presumed wheel included in the wheel region 214 on the basis of the features of a wheel of a bicycle. A wheel of a bicycle includes an axle in the center, a tire, and a spoke that couples the tire to the axle. Accordingly, the presumed wheel included in the wheel region 214 includes a presumed axle in the center, a presumed tire, and a presumed spoke that couples the presumed axle to the presumed tire. The presumed axle in the center and the presumed tire are large in size enough to obtain the distance information on the presumed axle and the presumed tire. Meanwhile, the presumed spoke occupies too small area on the screen to recognize anything more than background regarding which no distance information is obtainable, at a likely location for the presumed spoke. This often results in a failure in obtaining significant distance information. It follows, therefore, that the three-dimensional object included in the wheel region 214 is highly possibly a wheel, in a case where no distance information is included near the center of the three-dimensional object included the wheel region 214, i.e., at the likely location for the presumed spoke. It also follows that the three-dimensional object included in the wheel region 214 is highly possibly a wheel, in a case where nothing more than distance information corresponding to the background is obtained near the center of the three-dimensional object included in the wheel region 214, i.e., at the likely location for the presumed spoke. Meanwhile, in a case where the three-dimensional object included in the wheel region 214 is, for example, a road sign of a circular shape, the distance information is obtained not only at a circumferential periphery of a presumed road sign, but also near a center of the presumed road sign. It is, therefore, possible to determine that the three-dimensional object included in the wheel region 214 is not a wheel. Thus, this implementation involves deriving the ratio of the occupied area of the segment of the wheel region 214, e.g., the presumed axle and the presumed tire in this example, to the area of the wheel region 214, to determine the wheel-likeliness. The relative distance from the segment to the own vehicle 1 falls within the predetermined range. Note that in this example, the segment is both the presumed axle and the presumed tire. However, the segment may be the presumed axle, or alternatively, the segment may be the presumed tire.

In one specific but non-limiting example, the wheel determiner 164 may extract the segment from the distance image 128. The relative distance from the segment to the own vehicle 1 falls within the predetermined range of, for example, 10 meters to 20 meters both inclusive. Thus, for example, the presumed spoke in the wheel region 214 illustrated in part (a) of FIG. 9 is excluded. As illustrated in part (b) of FIG. 9, the presumed axle 218a and the presumed tire 218b of the presumed wheel are extracted. It is to be noted that the part (b) of FIG. 9 provides schematic illustration for purposes of convenience of description.

Thereafter, the wheel determiner 164 may derive a radius Rc of the presumed axle 218a of the presumed wheel, an internal radius Rin of the presumed tire 218b of the presumed wheel, and an external radius Rout of the presumed tire 218b of the presumed wheel. The derivation may be made on the basis of edges of the presumed axle 218a and the presumed tire 218b. In this implementation, the derivation of the radii may be made on the basis of an edge of any part of a circumference. In one alternative, radii of a plurality of parts along the circumference may be obtained, and an average of the radii thus obtained may be set as a representative radius. Thus, area of the presumed axle 218a is given by $\pi(Rc)^2$, in which Rc represents the radius of the presumed axle 218a of the presumed wheel. Area of the presumed tire 218b is given by $\pi(Rout^2-Rin^2)$, in which Rin represents the internal radius of the presumed tire 218b of the presumed wheel, and Rout represents the external radius of the presumed tire 218b of the presumed wheel. It follows that area of the extracted segment is given by $\pi(Rc)^2+\pi(Rout^2-Rin^2)$. The area of the wheel region 214 is given by $(2\times Rout)^2$.

Thereafter, the wheel determiner 164 may divide the area of the extracted segment by the area of the wheel region 214. In other words, the wheel determiner 164 may derive $(\pi(Rc)^2+\pi(Rout^2-Rin^2))/(2\times Rout)^2$, to obtain the area ratio of the extracted segment. In a case where the area ratio thus obtained is smaller than the predetermined value, e.g., 0.5, a determination may be made that the three-dimensional object included in the wheel region 214 is a wheel. In this implementation, the predetermined value, i.e., a threshold, is, for example, 0.5, but any value may be adopted in accordance with tests and/or performance.

It is to be noted that the forgoing description is made by giving an example in which the wheel-likeliness is determined on the basis of the area ratio of the segment of the wheel region 214, with the relative distance from the segment to the own vehicle 1 falling within the predetermined range. However, the wheel determiner 164 may employ other various determination modes in order to determine the wheel-likeliness more accurately. To give an example, the wheel-likeliness may be determined on the basis of the following factors such as, but not limited to, a size of the segment of the wheel region 214, with the relative distance from the segment to the own vehicle 1 falling within the predetermined range, sizes of the segments that correspond to the presumed axle 218a and the presumed tire 218b, a ratio of the sizes, a speed of movement of the wheel region 214, and uniformity of the speed of movement.

[Completion Confirmation Process S206]

The wheel determiner 164 may confirm whether or not the determination as to the wheel-likeliness has been made for all the plurality of the wheel regions 214 extracted. In a case where the determination as to the wheel-likeliness has been made for all the plurality of the wheel regions 214, the flow may move on to the bicycle determination process S208. In a case where the determination as to the wheel-likeliness has not been made for all the plurality of the wheel regions 214, the flow may move on to the wheel determination process S204, targeting at the wheel region 214 that has not been subjected to the determination as to the wheel-likeliness.
[Bicycle Determination Process S208]

Upon the wheel determiner 164 determining that the three-dimensional object included in the wheel region 214 is a wheel, or is highly possibly a wheel, the bicycle determiner 166 may determine, synthetically, on the basis of other pieces of information as well, that the three-dimensional object 210 is a bicycle, or more accurately, a bicycle a person is riding. The three-dimensional object 210 is included in the three-dimensional object region 212 that includes the wheel region 214 in a lower part in the direction of movement.

Upon the three-dimensional object 210 being identified as a bicycle in this way, the vehicle exterior environment recognition apparatus 120 may execute the collision avoidance control, in order to avoid the collision with the three-dimensional object 210.

In this implementation, the determination as to the wheel-likeliness is made on the basis of the area ratio of the segment of the wheel region 214. The relative distance from the segment to the own vehicle 1 falls within the predetermined range. Hence, it is possible to detect the specific object such as the bicycle with high accuracy. Moreover, in this implementation, by the wheel region identification process S202, the width and the height of the wheel region 214 become equal to the width and the height of the outline of the presumed wheel. This makes it possible to derive the area ratio with high accuracy in the wheel determination process S204.

The implementation also provides a program that causes a computer to function as the vehicle exterior environment recognition apparatus 120, and a non-transitory recording medium that stores the program. The non-transitory recording medium is computer readable. Non-limiting examples of the non-transitory recording medium may include a flexible disk, a magneto-optical disk, ROM, CD, DVD (Registered Trademark), and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For instance, in one implementation described above, the description is given of an example with the wheel region 214 being the square, i.e., the 27 inches by 27 inches square. The setting of the wheel region 214, however, may be provided in any size, any number, and/or any shape.

In one implementation described above, the description is made on an example in which the value $(\pi(Rc)^2+\pi(Rout^2-Rin^2))/(2\times Rout)^2$, i.e., the value obtained by dividing the area of the extracted segment by the area of the wheel region 214, is derived. In the example, in the case where the area ratio of the extracted segment is smaller than the predetermined value, e.g., 0.5, the determination is made that the three-dimensional object included in the wheel region 214 is a wheel. However, this is non-limiting. It suffices to derive, on the basis of the distance information, the area ratio of the segment, with the relative distance from the segment to the own vehicle 1 falling within the predetermined range. For example, the number of blocks or pixels of the extracted segment may be counted, and the counted value may be divided by the area of the wheel region 214 to derive the area ratio.

In one implementation described above, the description is made on an example of the identification of the bicycle as the specific object by the determination of the wheel-likeliness. However, the determination may be also applied to a vehicle that includes one or more wheels, such as a motorcycle or an automobile.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the central controller 154 illustrated in FIG. 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle exterior environment recognition apparatus, comprising:
a three-dimensional object region identifier configured to identify a three-dimensional object region out of a screen, the three-dimensional object region including a three-dimensional object;
a wheel region identifier configured to identify a wheel region out of the three-dimensional object region, the wheel region including a presumed wheel that seems to correspond to a wheel of a bicycle; and a wheel determiner configured to determine whether or not an area ratio is smaller than a predetermined value, the area ratio being a ratio of area of a segment of the wheel region to area of the wheel region, with a relative distance from the segment to an own vehicle falling within a predetermined range.

2. The vehicle exterior environment recognition apparatus according to claim 1, wherein the wheel determiner extracts, as the segment, a presumed axle and a presumed tire of the presumed wheel, and obtains the area ratio of the extracted segment.

3. The vehicle exterior environment recognition apparatus according to claim 2, wherein the wheel determiner derives a radius Rc of the presumed axle of the presumed wheel, an internal radius Rin of the presumed tire of the presumed wheel, and an external radius Rout of the presumed tire of the presumed wheel, and gives the area ratio by $(\pi(Rc)^2 + \pi(Rout^2 - Rin^2))/(2 \times Rout)^2$.

4. The vehicle exterior environment recognition apparatus according to claim 3, wherein the wheel region identifier derives, by Hough transform, a center of the presumed wheel included in the wheel region, and re-identifies the wheel region on a basis of the center of the presumed wheel.

5. A vehicle exterior environment recognition apparatus, comprising circuitry configured to identify a three-dimensional object region out of a screen, the three-dimensional object region including a three-dimensional object, identify a wheel region out of the three-dimensional object region, the wheel region including a presumed wheel that seems to correspond to a wheel of a bicycle, and determine whether or not an area ratio is smaller than a predetermined value, the area ratio being a ratio of area of a segment of the wheel region to area of the wheel region, with a relative distance from the segment to an own vehicle falling within a predetermined range.

* * * * *